US012633562B2

(12) United States Patent
Echigo et al.

(10) Patent No.: US 12,633,562 B2
(45) Date of Patent: May 19, 2026

(54) MANUFACTURING METHOD FOR ELECTROCHEMICAL ELEMENT AND ELECTROCHEMICAL ELEMENT

(71) Applicant: Osaka Gas Co., Ltd., Osaka (JP)

(72) Inventors: Mitsuaki Echigo, Osaka (JP); Hisao Ohnishi, Osaka (JP); Yuji Tsuda, Osaka (JP); Kyohei Manabe, Osaka (JP); Kazuyuki Minami, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 18 days.

(21) Appl. No.: 18/588,999

(22) Filed: Feb. 27, 2024

(65) Prior Publication Data

US 2024/0204228 A1　Jun. 20, 2024

Related U.S. Application Data

(62) Division of application No. 18/095,636, filed on Jan. 11, 2023, now abandoned, which is a division of
(Continued)

(30) Foreign Application Priority Data

Mar. 22, 2017　(JP) ................................. 2017-056732

(51) Int. Cl.
*H01M 8/1253*　(2016.01)
*H01M 8/1246*　(2016.01)
*H01M 8/12*　(2016.01)

(52) U.S. Cl.
CPC .. *H01M 8/1246* (2013.01); *H01M 2008/1293* (2013.01); *H01M 2300/0074* (2013.01)

(58) Field of Classification Search
CPC . H01M 2008/1293; H01M 2008/0074; H01M 8/1253
See application file for complete search history.

(56) References Cited

U.S. PATENT DOCUMENTS

2004/0058228 A1* 3/2004 Shibata ............... H01M 8/1226
429/480
2007/0072070 A1* 3/2007 Quek .................. H01M 8/1246
429/534
(Continued)

FOREIGN PATENT DOCUMENTS

JP　　200712361 A　1/2007
JP　　200886910 A　4/2008
(Continued)

OTHER PUBLICATIONS

Choi et al., "Preparation of Metal-supported SOFC using Low Temperature Ceramic Coating Process", Proceedings of 11th European SOFC & SOE Forum, Jul. 2014, Chapter 09—Session A15, pp. 14/117-20/117, 1:4, Lucerne, Switzerland.

*Primary Examiner* — Yoshitoshi Takeuchi
(74) *Attorney, Agent, or Firm* — The Webb Law Firm

(57) ABSTRACT

Provided is a low-cost electrochemical element that has excellent performance, reliability, and durability. Also, provided is a manufacturing method for an electrochemical element including a metal substrate (metal support) and an electrode layer formed on/over the metal substrate. The method includes an electrode layer forming step of forming an electrode layer having a region with a surface roughness of 1.0 μm or less on/over the metal substrate, and an electrolyte layer forming step of forming an electrolyte layer by spraying aerosolized metal oxide powder onto the electrode layer.

1 Claim, 1 Drawing Sheet

Related U.S. Application Data application No. 16/495,231, filed as application No. PCT/JP2018/011442 on Mar. 22, 2018, now abandoned.

(56)                References Cited

U.S. PATENT DOCUMENTS

| 2007/0180689 A1 | 8/2007 | Day et al. |
| 2007/0184322 A1* | 8/2007 | Huang ................ H01M 8/1246 |
| | | 429/495 |
| 2008/0160352 A1 | 7/2008 | Brandner et al. |
| 2010/0062317 A1* | 3/2010 | Selcuk ................ H01M 8/0245 |
| | | 422/186.04 |
| 2012/0244456 A1 | 9/2012 | Muecke et al. |
| 2013/0189606 A1 | 7/2013 | Ruettinger et al. |
| 2017/0309941 A1 | 10/2017 | Echigo et al. |

FOREIGN PATENT DOCUMENTS

| JP | 2010218759 A | 9/2010 |
| JP | 2011228280 A | 11/2011 |
| JP | 2016195029 A | 11/2016 |
| WO | 2016043328 A1 | 3/2016 |

* cited by examiner

MANUFACTURING METHOD FOR ELECTROCHEMICAL ELEMENT AND ELECTROCHEMICAL ELEMENT

CROSS-REFERENCE TO RELATED APPLICATIONS

This application is a divisional of U.S. patent application Ser. No. 18/095,636 filed Jan. 11, 2023 which is a divisional of U.S. patent application Ser. No. 16/495,231 filed Sep. 18, 2019 which is the United States national phase of International Application No. PCT/JP2018/011442 filed Mar. 22, 2018, and claims priority to Japanese Patent Application No. 2017-056732 filed Mar. 22, 2017, the disclosures of which are hereby incorporated by reference in their entirety.

TECHNICAL FIELD

The present invention relates to a manufacturing method for an electrochemical element, and an electrochemical element.

BACKGROUND ART

A conventional metal-supported solid oxide fuel cell (SOFC) is obtained by forming an anode electrode layer on/over a porous metal support obtained by sintering Fe—Cr based alloy powder, and forming an electrolyte layer on/over the anode electrode layer.

PRIOR ART DOCUMENTS

Non-Patent Document

Non-Patent Document 1: Jong-Jin Choi and Dong-Soo Park, "Preparation of Metal-supported SOFC using Low Temperature Ceramic Coating Process", Proceedings of 11th European SOFC & SOE Forum, A1502, Chapter 09—Session B15—14/117-20/117 (1-4 Jul. 2014)

DISCLOSURE OF THE INVENTION

Problem to be Solved by the Invention

However, as disclosed in Non-Patent Document 1, it is necessary to prepare an anode electrode layer subjected to heating treatment at a high temperature of 1300° C. in order to form a zirconia-based electrolyte in a low temperature range. Accordingly, damage to the metal support is unavoidable, and it is necessary to provide, through heating treatment at 1200° C., an expensive LST (LaSrTiO$_3$) diffusion preventing layer for preventing elements that poison a cell from diffusing from the metal support, and this poses problems of reliability, durability, and cost.

The present invention was achieved in light of the foregoing problems, and an object of the present invention is to provide a low-cost electrochemical element that has excellent performance, reliability, and durability.

Means for Solving Problem

A characteristic configuration of a manufacturing method for an electrochemical element for achieving the object is a manufacturing method for an electrochemical element including a metal support and an electrode layer formed on/over the metal support, the method including an electrode layer forming step of forming an electrode layer having a region with a surface roughness (Ra) of 1.0 μm or less on/over the metal support, and an electrolyte layer forming step of forming an electrolyte layer by spraying aerosolized metal oxide powder onto the electrode layer.

With the above-mentioned characteristic configuration, the electrode layer is suitable for an electrolyte layer formation process performed in a low temperature range, thus making it possible to form an electrochemical element including an electrode layer and an electrolyte layer on/over a metal support without providing an expensive LST diffusion preventing layer. It is also possible to manufacture an electrochemical element that has excellent reliability and durability as well as high adhesion strength between the electrode layer and the electrolyte layer.

A characteristic configuration of a manufacturing method for an electrochemical element for achieving the object is a manufacturing method for an electrochemical element including a metal support, an electrode layer formed on/over the metal support, and an intermediate layer formed on/over the electrode layer, the method including an intermediate layer forming step of forming an intermediate layer having a region with a surface roughness (Ra) of 1.0 μm or less on/over the electrode layer, and an electrolyte layer forming step of forming an electrolyte layer by spraying aerosolized metal oxide powder onto the intermediate layer.

With the above-mentioned characteristic configuration, the intermediate layer is suitable for an electrolyte layer formation process performed in a low temperature range, thus making it possible to form an electrochemical element including an electrode layer, an intermediate layer, and an electrolyte layer on/over a metal support without providing an expensive LST diffusion preventing layer. It is also possible to manufacture an electrochemical element that has excellent reliability and durability as well as high adhesion strength between the intermediate layer and the electrolyte layer.

In another characteristic configuration of the electrochemical element according to the present invention, the electrolyte layer contains stabilized zirconia.

With the above-mentioned characteristic configuration, the electrolyte layer contains stabilized zirconia, thus making it possible to realize an electrochemical element having excellent performance that can be used in a high temperature range of about 650° C. or higher, for example.

In a characteristic configuration of an electrochemical element according to the present invention, a dense electrolyte layer is formed by spraying aerosolized metal oxide powder onto an electrode layer that is formed on/over a metal support and has a region with a surface roughness (Ra) of 1.0 μm or less.

With the above-mentioned characteristic configuration, the electrode layer is suitable for an electrolyte layer formation process performed in a low temperature range, thus making it possible to form an electrochemical element including an electrode layer and an electrolyte layer on/over a metal support without providing an expensive LST diffusion preventing layer. It is also possible to configure an electrochemical element that has excellent reliability and durability as well as high adhesion strength between the electrode layer and the electrolyte layer.

In a characteristic configuration of an electrochemical element according to the present invention, a dense electrolyte layer is formed by spraying aerosolized metal oxide powder onto an intermediate layer that is formed on/over an electrode layer on/over a metal support and has a region with a surface roughness (Ra) of 1.0 μm or less.

With the above-mentioned characteristic configuration, the intermediate layer is suitable for an electrolyte layer formation process performed in a low temperature range, thus making it possible to form an electrochemical element including an electrode layer, an intermediate layer, and an electrolyte layer on/over a metal support without providing an expensive LST diffusion preventing layer. It is also possible to configure an electrochemical element that has excellent reliability and durability as well as high adhesion strength between the intermediate layer and the electrolyte layer.

BEST MODES FOR CARRYING OUT THE INVENTION

First Embodiment

Figures 1, 2:
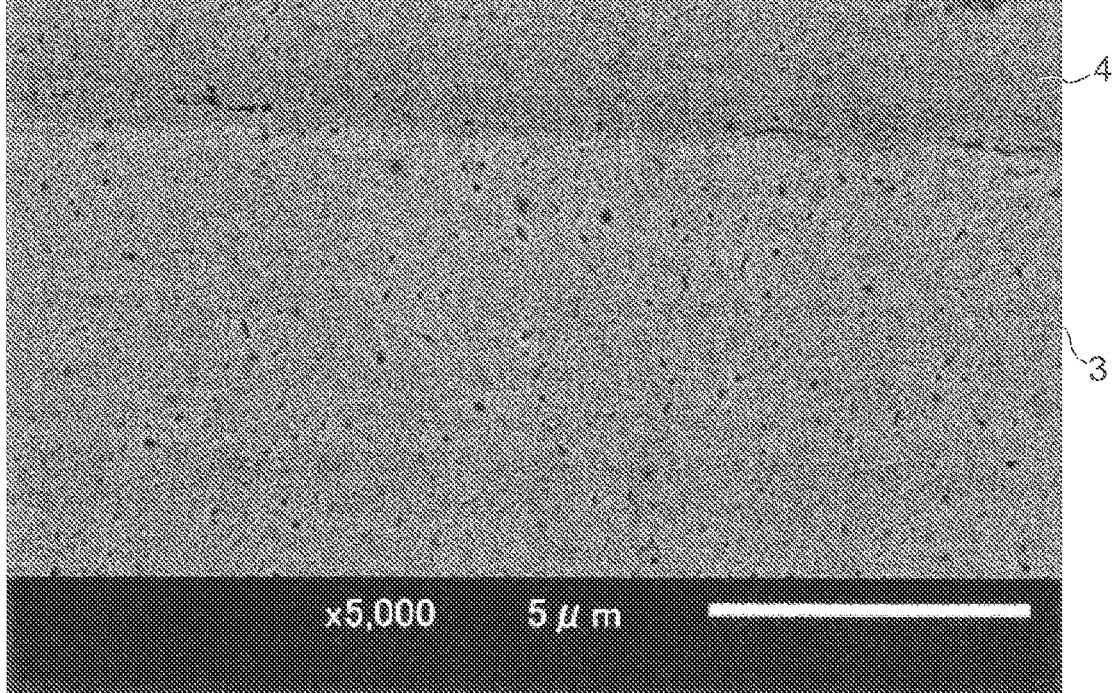
FIG. 1 is a schematic diagram showing a configuration of an electrochemical element.
FIG. 2 is an electron micrograph of a cross section of the electrochemical element.

Hereinafter, an electrochemical element E and a solid oxide fuel cell (SOFC) according to this embodiment will be described with reference to FIG. 1. The electrochemical element E is used as a constituent element of a solid oxide fuel cell that receives a supply of air and fuel gas containing hydrogen and generates power, for example. It should be noted that when the positional relationship between layers and the like are described in the description below, a counter electrode layer 6 side may be referred to as "upper portion" or "upper side", and an electrode layer 2 side may be referred to as "lower portion" or "lower side", with respect to an electrolyte layer 4, for example. In addition, in a metal substrate 1, a surface on/over which the electrode layer 2 is formed may be referred to as "front side", and a surface on/over an opposite side may be referred to as "back side". Electrochemical Element As shown in FIG. 1, the electrochemical element E includes a metal substrate 1 (metal support), an electrode layer 2 formed on/over the metal substrate 1, an intermediate layer 3 formed on/over the electrode layer 2, and an electrolyte layer 4 formed on/over the intermediate layer 3. The electrochemical element E further includes a reaction preventing layer 5 formed on/over the electrolyte layer 4, and a counter electrode layer 6 formed on/over the reaction preventing layer 5. Specifically, the counter electrode layer 6 is formed above the electrolyte layer 4, and the reaction preventing layer 5 is formed between the electrolyte layer 4 and the counter electrode layer 6. The electrode layer 2 is porous, and the electrolyte layer 4 is dense. Metal Substrate The metal substrate 1 plays a role as a support that supports the electrode layer 2, the intermediate layer 3, the electrolyte layer 4, and the like and maintains the strength of the electrochemical element E. A material that has excellent electron conductivity, thermal resistance, oxidation resistance, and corrosion resistance is used as the material for forming the metal substrate 1. Examples thereof include ferrite-based stainless steel, austenite-based stainless steel, and nickel-based alloys. In particular, alloys containing chromium are favorably used. It should be noted that although a plate-shaped metal substrate 1 is used as the metal support in this embodiment, a metal support having another shape such as a box shape or cylindrical shape can also be used.

It should be noted that the metal substrate 1 need only have a strength sufficient for serving as the support for forming the electrochemical element, and can have a thickness of approximately 0.1 mm to 2 mm, preferably approximately 0.1 mm to 1 mm, and more preferably approximately 0.1 mm to 0.5 mm, for example.

The metal substrate 1 is provided with a plurality of through holes 1a that penetrate the surface on the front side and the surface on the back side. It should be noted that the through holes 1a can be provided in the metal substrate 1 through mechanical, chemical, or optical piercing processing, for example. The through holes 1a have a function of transmitting gas from the surface on the back side of the metal substrate 1 to the surface on the front side thereof. Porous metal can also be used to impart gas permeability to the metal substrate 1. A metal sintered body, a metal foam, or the like can also be used as the metal substrate 1, for example.

A metal oxide thin layer 1b serving as a diffusion suppressing layer is provided on/over the surfaces of the metal substrate 1. That is, the diffusion suppressing layer is formed between the metal substrate 1 and the electrode layer 2, which will be described later. The metal oxide thin layer 1b is provided not only on/over the surface of the metal substrate 1 exposed to the outside but also the surface (interface) that is in contact with the electrode layer 2 and the inner surfaces of the through holes 1a. Element interdiffusion that occurs between the metal substrate 1 and the electrode layer 2 can be suppressed due to this metal oxide thin layer 1b. For example, when ferrite-based stainless steel containing chromium is used in the metal substrate 1, the metal oxide thin layer 1b is mainly made of a chromium oxide. The metal oxide thin layer 1b containing the chromium oxide as the main component suppresses diffusion of chromium atoms and the like of the metal substrate 1 to the electrode layer 2 and the electrolyte layer 4. The metal oxide thin layer 1b need only have such a thickness that allows both high diffusion preventing performance and low electric resistance to be achieved. For example, it is preferable that the thickness is on the order of submicrons, and specifically, it is more preferable that the average thickness is approximately 0.3 $\mu$m or more and 0.7 $\mu$m or less. It is more preferable that the minimum thickness is about 0.1 $\mu$m or more.

Also, it is preferable that the maximum thickness is about 1.1 $\mu$m or less.

The metal oxide thin layer 1b can be formed using various techniques, but it is favorable to use a technique of oxidizing the surface of the metal substrate 1 to obtain a metal oxide. Also, the metal oxide thin layer 1b may be formed on/over the surface of the metal substrate 1 by using a PVD technique such as a sputtering technique or PLD technique, a CVD technique, or a spray coating technique (a technique such as thermal spraying technique, an aerosol deposition technique, an aerosol gas deposition technique, a powder jet deposition technique, a particle jet deposition technique, or a cold spraying technique), or may be formed by plating and oxidation treatment. Furthermore, the metal oxide thin layer 1b may also contain a spinel phase that has high electron conductivity, or the like.

When a ferrite-based stainless steel material is used to form the metal substrate 1, its thermal expansion coefficient is close to that of YSZ (yttria-stabilized zirconia), GDC (gadolinium-doped ceria; also called CGO), or the like, which is used as the material for forming the electrode layer 2 and the electrolyte layer 4. Accordingly, even if low and high temperature cycling is repeated, the electrochemical element E is not likely to be damaged. Therefore, this is preferable due to being able to realize an electrochemical element E that has excellent long-term durability.

Electrode Layer

As shown in FIG. 1, the electrode layer 2 can be provided as a thin layer in a region that is larger than the region provided with the through holes 1*a*, on/over the front surface of the metal substrate 1. When it is provided as a thin layer, the thickness can be set to approximately 1 μm to 100 μm, and preferably 5 μm to 50 μm, for example. This thickness makes it possible to ensure sufficient electrode performance while also achieving cost reduction by reducing the used amount of expensive electrode layer material. The region provided with the through holes 1*a* is entirely covered with the electrode layer 2. That is, the through holes 1*a* are formed inside the region of the metal substrate 1 in which the electrode layer 2 is formed. In other words, all the through holes 1*a* are provided facing the electrode layer 2.

A composite material such as NiO-GDC, Ni-GDC, NiO—YSZ, Ni—YSZ, CuO—CeO$_2$, or Cu—CeO$_2$ can be used as the material for forming the electrode layer 2, for example. In these examples, GDC, YSZ, and CeO$_2$ can be called the aggregate of the composite material. It should be noted that it is preferable to form the electrode layer 2 using low-temperature heating (not performing heating treatment in a high temperature range of higher than 1100° C., but rather performing a wet process using heating treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Due to these processes that can be used in a low temperature range, a favorable electrode layer 2 is obtained without using heating in a high temperature range of higher than 1100° C., for example. Therefore, this is preferable due to being able to prevent damage to the metal substrate 1, suppress element interdiffusion between the metal substrate 1 and the electrode layer 2, and realize an electrochemical element that has excellent durability. Furthermore, using low-temperature heating makes it possible to facilitate handling of raw materials and is thus more preferable.

The inside and the surface of the electrode layer 2 are provided with a plurality of pores in order to impart gas permeability to the electrode layer 2.

That is, the electrode layer 2 is formed as a porous layer. The electrode layer 2 is formed to have a denseness of 30% or more and less than 80%, for example. Regarding the size of the pores, a size suitable for smooth progress of an electrochemical reaction can be selected as appropriate. It should be noted that the "denseness" is a ratio of the material of the layer to the space and can be represented by a formula "1−porosity", and is equivalent to relative density.

Intermediate Layer

As shown in FIG. 1, the intermediate layer 3 can be formed as a thin layer on/over the electrode layer 2 so as to cover the electrode layer 2. When it is formed as a thin layer, the thickness can be set to approximately 1 μm to 100 μm, preferably approximately 2 μm to 50 μm, and more preferably approximately 4 μm to 25 μm, for example. This thickness makes it possible to ensure sufficient performance while also achieving cost reduction by reducing the used amount of expensive intermediate layer material. YSZ (yttria-stabilized zirconia), SSZ (scandium-stabilized zirconia), GDC (gadolinium-doped ceria), YDC (yttrium-doped ceria), SDC (samarium-doped ceria), or the like can be used as the material for forming the intermediate layer 3. In particular, ceria-based ceramics are favorably used.

It is preferable to form the intermediate layer 3 using low-temperature heating (not performing heating treatment in a high temperature range of higher than 1100° C., but rather performing a wet process using heating treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Due to these film formation processes that can be used in a low temperature range, an intermediate layer 3 is obtained without using heating in a high temperature range of higher than 1100° C., for example. Therefore, it is possible to prevent damage to the metal substrate 1, suppress element interdiffusion between the metal substrate 1 and the electrode layer 2, and realize an electrochemical element E that has excellent durability. Furthermore, using low-temperature heating makes it possible to facilitate handling of raw materials and is thus more preferable.

It is preferable that the intermediate layer 3 has oxygen ion (oxide ion) conductivity. It is more preferable that the intermediate layer 3 has both oxygen ion (oxide ion) conductivity and electron conductivity, namely mixed conductivity. The intermediate layer 3 that has these properties is suitable for application to the electrochemical element E.

Surface Roughness (Ra) of Intermediate Layer

In this embodiment, the intermediate layer 3 has a region with a surface roughness (Ra) of 1.0 μm or less. This region may correspond to all or a part of the surface of the intermediate layer 3. An electrochemical element E that has excellent reliability and durability as well as high adhesion strength between the intermediate layer 3 and the electrolyte layer 4 can be configured due to the intermediate layer 3 having a region with a surface roughness (Ra) of 1.0 μm or less. It should be noted that the intermediate layer 3 more preferably has a region with a surface roughness (Ra) of 0.5 μm or less, and even more preferably 0.3 μm or less. The reason for this is that an electrochemical element E that has excellent reliability and durability as well as higher adhesion strength between the intermediate layer 3 and the electrolyte layer 4 can be configured if the intermediate layer 3 is smoother in terms of the surface roughness.

Electrolyte Layer

As shown in FIG. 1, the electrolyte layer 4 is formed as a thin layer on/over the intermediate layer 3 so as to cover the electrode layer 2 and the intermediate layer 3. Specifically, as shown in FIG. 1, the electrolyte layer 4 is provided on/over both the intermediate layer 3 and the metal substrate 1 (spanning the intermediate layer 3 and the metal substrate 1). Configuring the electrolyte layer 4 in this manner and joining the electrolyte layer 4 to the metal substrate 1 make it possible to allow the electrochemical element to have excellent toughness as a whole.

Also, as shown in FIG. 1, the electrolyte layer 4 is provided in a region that is larger than the region provided with the through holes 1*a*, on/over the front surface of the metal substrate 1. That is, the through holes 1*a* are formed inside the region of the metal substrate 1 in which the electrolyte layer 4 is formed.

The leakage of gas from the electrode layer 2 and the intermediate layer 3 can be suppressed in the vicinity of the electrolyte layer 4. A description of this will be given. When the electrochemical element E is used as a constituent element of a SOFC, gas is supplied from the back side of the metal substrate 1 through the through holes 1a to the electrode layer 2 during the operation of the SOFC. In a region where the electrolyte layer 4 is in contact with the metal substrate 1, leakage of gas can be suppressed without providing another member such as a gasket. It should be noted that although the entire vicinity of the electrode layer 2 is covered with the electrolyte layer 4 in this embodiment, a configuration in which the electrolyte layer 4 is provided on/over the electrode layer 2 and the intermediate layer 3 and a gasket or the like is provided in its vicinity may also be adopted.

YSZ (yttria-stabilized zirconia), SSZ (scandium-stabilized zirconia), GDC (gadolinium-doped ceria), YDC (yttrium-doped ceria), SDC (samarium-doped ceria), LSGM (strontium- and magnesium-doped lanthanum gallate), or the like can be used as the material for forming the electrolyte layer 4. In particular, zirconia-based ceramics are favorably used. Using zirconia-based ceramics for the electrolyte layer 4 makes it possible to increase the operation temperature of the SOFC in which the electrochemical element E is used compared with the case where ceria-based ceramics are used. For example, when the electrochemical element E is used in the SOFC, by adopting a system configuration in which a material such as YSZ that can exhibit high electrolyte performance even in a high temperature range of approximately 650° C. or higher is used as the material for forming the electrolyte layer 4, a hydrocarbon-based raw fuel material such as city gas or LPG is used as the raw fuel for the system, and the raw fuel material is reformed into anode gas of the SOFC through steam reforming or the like, it is thus possible to construct a high-efficiency SOFC system in which heat generated in a cell stack of the SOFC is used to reform raw fuel gas.

It is preferable to form the electrolyte layer 4 using an aerosol deposition technique. Due to such a film formation process that can be used in a low temperature range, an electrolyte layer 4 that is dense and has high gas-tightness and gas barrier properties is obtained without using heating in a high temperature range of higher than 1100° C., for example. Therefore, it is possible to prevent damage to the metal substrate 1, suppress element interdiffusion between the metal substrate 1 and the electrode layer 2, and realize an electrochemical element E that has excellent performance and durability.

The electrolyte layer 4 is given a dense configuration in order to block gas leakage of anode gas and cathode gas and exhibit high ion conductivity. The electrolyte layer 4 preferably has a denseness of 90% or more, more preferably 95% or more, and even more preferably 98% or more. When the electrolyte layer 4 is formed as a uniform layer, the denseness is preferably 95% or more, and more preferably 98% or more. When the electrolyte layer 4 has a multilayer configuration, at least a portion thereof preferably includes a layer (dense electrolyte layer) having a denseness of 98% or more, and more preferably a layer (dense electrolyte layer) having a denseness of 99% or more. The reason for this is that an electrolyte layer that is dense and has high gas-tightness and gas barrier properties can be easily formed due to such a dense electrolyte layer being included as a portion of the electrolyte layer even when the electrolyte layer has a multilayer configuration.

Reaction Preventing Layer

The reaction preventing layer 5 can be formed as a thin layer on/over the electrolyte layer 4. When it is formed as a thin layer, the thickness can be set to approximately 1 μm to 100 μm, preferably approximately 2 μm to 50 μm, and more preferably approximately 4 μm to 25 μm, for example. This thickness makes it possible to ensure sufficient performance while also achieving cost reduction by reducing the used amount of expensive reaction preventing layer material. The material for forming the reaction preventing layer 5 need only be capable of preventing reactions between the component of the electrolyte layer 4 and the component of the counter electrode layer 6. For example, a ceria-based material or the like is used. Introducing the reaction preventing layer 5 between the electrolyte layer 4 and the counter electrode layer 6 effectively suppresses reactions between the material constituting the counter electrode layer 6 and the material constituting the electrolyte layer 4 and makes it possible to improve long-term stability in the performance of the electrochemical element E. Forming the reaction preventing layer 5 using, as appropriate, a method through which the reaction preventing layer 5 can be formed at a treatment temperature of 1100° C. or lower makes it possible to suppress damage to the metal substrate 1, suppress element interdiffusion between the metal substrate 1 and the electrode layer 2, and realize an electrochemical element E that has excellent performance and durability, and is thus preferable. For example, the reaction preventing layer 5 can be formed using, as appropriate, low-temperature heating (not performing heating treatment in a high temperature range of higher than 1100° C., but rather performing a wet process using heating treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. In particular, using low-temperature heating, an aerosol deposition technique, or the like makes it possible to realize a low-cost element and is thus preferable. Furthermore, using low-temperature heating makes it possible to facilitate handling of raw materials and is thus more preferable.

Counter Electrode Layer

The counter electrode layer 6 can be formed as a thin layer on/over the electrolyte layer 4 or the reaction preventing layer 5. When it is formed as a thin layer, the thickness can be set to approximately 1 μm to 100 μm, and preferably approximately 5 μm to 50 μm, for example. This thickness makes it possible to ensure sufficient electrode performance while also achieving cost reduction by reducing the used amount of expensive counter electrode layer material. A complex oxide such as LSCF or LSM can be used as the material for forming the counter electrode layer 6, for example. The counter electrode layer 6 constituted by the above-mentioned material functions as a cathode.

It should be noted that forming the counter electrode layer 6 using, as appropriate, a method through which the counter electrode layer 6 can be formed at a treatment temperature of 1100° C. or lower makes it possible to suppress damage to the metal substrate 1, suppress element interdiffusion between the metal substrate 1 and the electrode layer 2, and realize an electrochemical element E that has excellent performance and durability, and is thus preferable. For example, the counter electrode layer 6 can be formed using, as appropriate, low-temperature heating (not performing heating treatment in a high temperature range of higher than 1100° C., but rather performing a wet process using heating treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. In particular, using low-temperature heating, a spray coating technique, or the like makes it possible to realize a low-cost element and is thus preferable. Furthermore, using low-temperature heating makes it possible to facilitate handling of raw materials and is thus more preferable.

Solid Oxide Fuel Cell

The electrochemical element E configured as described above can be used as a power generating cell for a solid oxide fuel cell. For example, fuel gas containing hydrogen is supplied from the back surface of the metal substrate 1 through the through holes 1*a* to the electrode layer 2, air is supplied to the counter electrode layer 6 serving as a counter electrode of the electrode layer 2, and the operation is performed at a temperature of 600° C. or higher and 850° C. or lower, for example. Accordingly, the oxygen $O_2$ included in air reacts with electrons e⁻ in the counter electrode layer 6, thus producing oxygen ions $O^{2-}$. The oxygen ions $O^{2-}$ move through the electrolyte layer 4 to the electrode layer 2. In the electrode layer 2, the hydrogen $H_2$ included in the supplied fuel gas reacts with the oxygen ions $O^{2-}$, thus producing water $H_2O$ and electrons e⁻. With these reactions, electromotive force is generated between the electrode layer 2 and the counter electrode layer 6. In this case, the electrode layer 2 functions as a fuel electrode (anode) of the SOFC, and the counter electrode layer 6 functions as an air electrode (cathode).

Manufacturing Method for Electrochemical Element Next, a manufacturing method for the electrochemical element E according to this embodiment will be described.

Electrode Layer Forming Step

In an electrode layer forming step, the electrode layer 2 is formed as a thin film in a region that is broader than the region provided with the through holes 1*a*, on/over the front surface of the metal substrate 1. The through holes of the metal substrate 1 can be provided through laser processing or the like. As described above, the electrode layer 2 can be formed using low-temperature heating (a wet process using heating treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal substrate 1.

The following is an example of the case where low-temperature heating is performed as the electrode layer forming step. First, a material paste is produced by mixing powder of the material for forming the electrode layer 2 and a solvent (dispersion medium), and is applied to the front surface of the metal substrate 1. Then, the electrode layer 2 is obtained through compression shape forming (electrode layer smoothing step) and heating at a temperature of 1100° C. or lower (electrode layer heating step). Examples of compression shape forming of the electrode layer 2 include CIP (Cold Isostatic Pressing) shape forming, roll pressing shape forming, and RIP (Rubber Isostatic Pressing) shape forming. It is favorable to perform heating of the electrode layer 2 at a temperature of 800° C. or higher and 1100° C. or lower. The order in which the electrode layer smoothing step and the electrode layer heating step are performed can be changed. It should be noted that, when an electrochemical element including an intermediate layer is formed, the electrode layer smoothing step and the electrode layer heating step may be omitted, and an intermediate layer smoothing step and an intermediate layer heating step, which will be described later, may include the electrode layer smoothing step and the electrode layer heating step.

It should be noted that lapping shape forming, leveling treatment, surface cutting treatment, surface polishing treatment, or the like can also be performed as the electrode layer smoothing step.

Diffusion Suppressing Layer Forming Step

The metal oxide thin layer 1*b* (diffusion suppressing layer) is formed on/over the surface of the metal substrate 1 during the heating step in the above-described electrode layer forming step. It should be noted that it is preferable that the above-mentioned heating step includes a heating step in which the heating atmosphere satisfies the atmospheric condition that the oxygen partial pressure is low because a high-quality metal oxide thin layer 1*b* (diffusion suppressing layer) that has a high element interdiffusion suppressing effect and has a low resistance value is formed. In a case where a coating method that does not include heating is performed as the electrode layer forming step, for example, a separate diffusion suppressing layer forming step may also be included. In any case, it is desirable to perform these steps at a temperature of 1100° C. or lower such that damage to the metal substrate 1 can be suppressed. The metal oxide thin layer 1*b* (diffusion suppressing layer) may be formed on/over the surface of the metal substrate 1 during the heating step in an intermediate layer forming step, which will be described later.

Intermediate Layer Forming Step

In an intermediate layer forming step, the intermediate layer 3 is formed as a thin layer on/over the electrode layer 2 so as to cover the electrode layer 2. As described above, the intermediate layer 3 can be formed using low-temperature heating (a wet process using heating treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal substrate 1.

The following is an example of the case where low-temperature heating is performed as the intermediate layer forming step. First, a material paste is produced by mixing powder of the material for forming the intermediate layer 3 and a solvent (dispersion medium), and is applied to the front surface of the metal substrate 1. Then, the intermediate layer 3 is obtained through compression shape forming (intermediate layer smoothing step) and heating at a temperature of 1100° C. or lower (intermediate layer heating step). Examples of compression shape forming to be performed on the intermediate layer 3 include CIP (Cold Isostatic Pressing) shape forming, roll pressing shape forming, and RIP (Rubber Isostatic Pressing) shape forming. It is favorable to perform heating of the intermediate layer 3 at a temperature of 800° C. or higher and 1100° C. or lower. The reason for this is that this temperature makes it possible to form an intermediate layer 3 that has high strength while suppressing damage to and deterioration of the metal substrate 1. It is more preferable to perform heating of the intermediate layer 3 at a temperature of 1050° C. or lower, and more preferably 1000° C. or lower. The reason for this is that the lower the heating temperature of the intermediate layer 3 is, the more likely it is to further suppress damage to and deterioration of the metal substrate 1 when forming the electrochemical element E. It should be noted that the order in which the intermediate layer smoothing step and the intermediate layer heating step are performed can be changed.

It should be noted that lapping shape forming, leveling treatment, surface cutting treatment, surface polishing treatment, or the like can also be performed as the intermediate layer smoothing step.

Electrolyte Layer Forming Step

In an electrolyte layer forming step, the electrolyte layer 4 is formed as a thin layer on/over the intermediate layer 3 so as to cover the electrode layer 2 and the intermediate layer 3.

It is desirable to perform an aerosol deposition technique as the electrolyte layer forming step in order to form a high-quality electrolyte layer 4 that is dense and has high gas-tightness and gas barrier properties in a temperature range of 1100° C. or lower. In this case, aerosolized powder of the material for forming the electrolyte layer 4 is sprayed onto the intermediate layer 3 on/over the metal substrate 1, and the electrolyte layer 4 is thus formed.

Reaction Preventing Layer Forming Step

In a reaction preventing layer forming step, the reaction preventing layer 5 is formed as a thin layer on/over the electrolyte layer 4. As described above, the reaction preventing layer 5 can be formed using low-temperature heating (not performing heating treatment in a high temperature range of higher than 1100° C., but rather performing a wet process using heating treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal substrate 1.

Counter Electrode Layer Forming Step

In a counter electrode layer forming step, the counter electrode layer 6 is formed as a thin layer on/over the reaction preventing layer 5. As described above, the counter electrode layer 6 can be formed using low-temperature heating (not performing heating treatment in a high temperature range of higher than 1100° C., but rather performing a wet process using heating treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal substrate 1.

In this manner, the electrochemical element E can be manufactured. That is, the manufacturing method for an electrochemical element according to this embodiment is a manufacturing method for an electrochemical element including a metal substrate 1 (metal support), an electrode layer 2 formed on/over the metal substrate 1, an intermediate layer 3 formed on/over the electrode layer 2, and an electrolyte layer 4 on/over the intermediate layer 3, and the method includes an intermediate layer forming step of forming the intermediate layer 3 with a surface roughness (Ra) of 1.0 μm or less on/over the electrode layer 2, and an electrolyte layer forming step of forming the electrolyte layer 4 by spraying aerosolized metal oxide powder onto the intermediate layer 3.

It should be noted that a configuration in which the electrochemical element E does not include both or either of the intermediate layer 3 and the reaction preventing layer 5 is also possible. That is, a configuration in which the electrode layer 2 and the electrolyte layer 4 are in contact with each other, or a configuration in which the electrolyte layer 4 and the counter electrode layer 6 are in contact with each other is also possible. In this case, in the above-described manufacturing method, the intermediate layer forming step and the reaction preventing layer forming step are omitted. It should be noted that it is also possible to add a step of forming another layer or to form a plurality of layers of the same type one on/over top of another, but in any case, it is desirable to perform these steps at a temperature of 1100° C. or lower.

EXAMPLES

A metal substrate 1 was produced by providing a plurality of through holes 1*a* through laser processing in a region with a radius of 2.5 mm from the center of a crofer 22 APU metal plate having a circular shape with a thickness of 0.3 mm and a diameter of 25 mm. It should be noted that, at this time, the through holes 1*a* on the surface of the metal substrate 1 were provided through laser processing.

Next, a paste was produced by mixing 60 wt % of NiO powder and 40 wt % of GDC powder and adding an organic binder and an organic solvent (dispersion medium) thereto. The paste was used to form an electrode layer 2 on/over a region with a radius of 3 mm from the center of the metal substrate 1. It should be noted that the electrode layer 2 was formed using screen printing. Then, heating treatment was performed at 950° C. on the metal substrate 1 on/over which the electrode layer 2 was formed (electrode layer forming step, diffusion suppressing layer forming step).

Next, a paste was produced by adding an organic binder and an organic solvent (dispersion medium) to fine powder of GDC. The paste was used to form an intermediate layer 3, through screen printing, on/over a region with a radius of 5 mm from the center of the metal substrate 1 on which the electrode layer 2 was formed. Next, the intermediate layer 3 having a flat surface was formed by performing CIP shape forming with a pressure of 300 MPa on the metal substrate 1 on/over which the intermediate layer 3 was formed and then performing heating treatment at 1000° C. (intermediate layer forming step).

The electrode layer 2 and the intermediate layer 3 obtained through the above-described steps had a thickness of about 20 μm and about 10 μm, respectively. Moreover, the He leakage amount of metal substrate 1 on/over which the electrode layer 2 and the intermediate layer 3 were formed in this manner was 11.5 mL/minute·cm² under a pressure of 0.2 MPa.

Subsequently, powder of 8YSZ (yttria-stabilized zirconia) with a mode diameter of about 0.7 μm was aerosolized using dry air at a flow rate of 13 L/min. The aerosol was introduced into a chamber in which the pressure was set to 250 Pa, and then an electrolyte layer 4 was formed by spraying the aerosol onto 15 mm×15 mm region on/over the metal substrate 1 on/over which the electrode layer 2 and the intermediate layer 3 was formed, so as to cover the intermediate layer 3 (aerosol deposition technique). It should be noted that, at this time, the metal substrate 1 was not heated (electrolyte layer forming step).

The electrolyte layer 4 obtained through the above-described step had a thickness of approximately 3 to 4 μm. The He leakage amount of the metal substrate 1 on/over which the electrode layer 2, the intermediate layer 3, and the electrolyte layer 4 were formed was measured under a pressure of 0.2 MPa. The determined He leakage amount was smaller than the lower detection limit (1.0 mL/minute·cm²). That is, compared with the He leakage amount after forming the intermediate layer 3, the He leakage amount after forming the electrolyte layer 4 decreased significantly and was smaller than the lower detection limit. It was thus confirmed that a high-quality electrolyte layer 4 that was dense and had increased gas barrier properties was formed.

Next, a paste was produced by adding an organic binder and an organic solvent (dispersion medium) to fine powder of GDC. The paste was used to form a reaction preventing layer 5 on/over the electrolyte layer 4 of the electrochemical element E using screen printing.

Thereafter, the reaction preventing layer 5 was formed by performing heating treatment at 1000° C. on the electrochemical element E on/over which the reaction preventing layer 5 was formed (reaction preventing layer forming step).

Furthermore, a paste was produced by mixing GDC powder and LSCF powder and adding an organic binder and an organic solvent (dispersion medium) thereto. The paste was used to form a counter electrode layer 6 on/over the reaction preventing layer 5 using screen printing. Lastly, a final electrochemical element E was obtained by heating, at 900° C., the electrochemical element E on/over which the counter electrode layer 6 was formed (counter electrode layer forming step).

Hydrogen gas and air were respectively supplied to the electrode layer 2 and the counter electrode layer 6, and the open circuit voltage (OCV) of the obtained electrochemical element E serving as a cell for a solid oxide fuel cell was measured. The result was 1.07 V at 750° C.

FIG. 2 shows an electron micrograph of a cross section of the electrochemical element E. As is clear from the electron micrograph, the dense electrolyte layer 4 was formed on/over the smooth surface with a surface roughness (Ra) of 1.0 μm or less of the intermediate layer 3 on the side facing the electrolyte layer, and it is thus clear that a cell for a solid oxide fuel cell (electrochemical element E) that had favorable performance was obtained.

Five samples were produced in the same manner, and the surface roughnesses (Ra) of the intermediate layers 3 of these samples were measured using a laser microscope. Table 1 shows the results.

TABLE 1

| | Surface roughness (Ra) of intermediate layer | |
| --- | --- | --- |
| | Calculated value for 259-μm width | Calculated value for 642-μm width |
| Sample 1 | 0.064 μm to 0.104 μm | 0.139 μm to 0.196 μm |
| Sample 2 | 0.066 μm to 0.224 μm | 0.117 μm to 0.209 μm |
| Sample 3 | 0.066 μm to 0.224 μm | 0.117 μm to 0.209 μm |
| Sample 4 | 0.117 μm to 0.209 μm | 0.221 μm to 0.156 μm |
| Sample 5 | 0.152 μm to 0.210 μm | 0.087 μm to 0.124 μm |

In all the samples, the surface roughness (Ra) of the intermediate layer 3 was 1.0 μm or less, and a favorable electrolyte layer 4 could be formed on/over the intermediate layer 3.

Next, regarding samples in which there was difficulty in forming the electrolyte layer 4 in which a favorable electrolyte layer 4 could not be formed on/over the intermediate layer 3 and whose open circuit voltages (OCVs) did not reach 1 V or higher at 750° C., the surface roughnesses (Ra) of the intermediate layers 3 were measured using a laser microscope. Table 2 shows the results.

TABLE 2

| | Surface roughness (Ra) of intermediate layer | |
| --- | --- | --- |
| | Calculated value for 259-μm width | Calculated value for 642-μm width |
| Sample 6 | 1.624 μm to 2.499 μm | 1.350 μm |
| Sample 7 | 3.718 μm to 8.230 μm | 2.596 μm to 6.094 μm |

In both samples, the surface roughness (Ra) of the intermediate layer 3 was greater than 1.0 μm.

It was shown from the above results that setting the surface roughness (Ra) of the intermediate layer 3 to 1.0 μm or less makes it possible to form a favorable electrolyte layer.

Second Embodiment

An electrochemical element E according to this embodiment has a configuration in which the intermediate layer 3 is not provided, that is, the electrode layer 2 and the electrolyte layer 4 are in contact with each other. Therefore, in the manufacturing method for the electrochemical element E, the intermediate layer forming step is omitted.

The electrochemical element E according to this embodiment includes the metal substrate 1 (metal support), the electrode layer 2 formed on/over the metal substrate 1, and the electrolyte layer 4 formed on/over the electrode layer 2. The electrochemical element E further includes the reaction preventing layer 5 formed on/over the electrolyte layer 4, and the counter electrode layer 6 formed on/over the reaction preventing layer 5. Specifically, the counter electrode layer 6 is formed above the electrolyte layer 4, and the reaction preventing layer 5 is formed between the electrolyte layer 4 and the counter electrode layer 6. The electrode layer 2 is porous, and the electrolyte layer 4 is dense.

In this embodiment, the electrode layer 2 has a region with a surface roughness (Ra) of 1.0 μm or less. This region may correspond to all or a part of the surface of the electrode layer 2. An electrochemical element E that has excellent reliability and durability as well as high adhesion strength between the electrode layer 2 and the electrolyte layer 4 can be configured due to the electrode layer 2 having a region with a surface roughness (Ra) of 1.0 μm or less. It should be noted that the electrode layer 2 more preferably has a region with a surface roughness (Ra) of 0.5 m or less, and even more preferably 0.3 μm or less. The reason for this is that an electrochemical element E that has excellent reliability and durability as well as higher adhesion strength between the electrode layer 2 and the electrolyte layer 4 can be configured if the electrode layer 2 is smoother in terms of the surface roughness.

Manufacturing Method for Electrochemical Element

Next, a manufacturing method for the electrochemical element E according to this embodiment will be described. The electrochemical element E according to this embodiment does not include the intermediate layer 3. Accordingly, in the manufacturing method for the electrochemical element E according to this embodiment, the electrode layer forming step (diffusion suppressing layer forming step), the electrolyte layer forming step, the reaction preventing layer forming step, and the counter electrode layer forming step are performed in the stated order.

Electrode Layer Forming Step

In the electrode layer forming step, the electrode layer 2 is formed as a thin film in a region that is broader than the region provided with the through holes 1a, on/over the front surface of the metal substrate 1. The through holes of the metal substrate 1 can be provided through laser processing or the like. As described above, the electrode layer 2 can be formed using low-temperature heating (a wet process using heating treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the metal substrate 1.

The following is an example of the case where low-temperature heating is performed as the electrode layer forming step. First, a material paste is produced by mixing powder of the material for forming the electrode layer 2 and a solvent (dispersion medium), and is applied to the front surface of the metal substrate 1. Then, the electrode layer 2 is obtained through compression shape forming (electrode layer smoothing step) and heating at a temperature of 1100° C. or lower (electrode layer heating step). Examples of compression shape forming of the electrode layer 2 include CIP (Cold Isostatic Pressing) shape forming, roll pressing shape forming, and RIP (Rubber Isostatic Pressing) shape forming. It is favorable to perform heating of the electrode layer 2 at a temperature of 800° C. or higher and 1100° C. or lower. The reason for this is that this temperature makes it possible to form an electrode layer 2 that has high strength while suppressing damage to and deterioration/over of the metal substrate 1. It is more preferable to perform heating of the electrode layer 2 at a temperature of 1050° C. or lower, and more preferably 1000° C. or lower. The reason for this is that the electrochemical element E can be formed with damage to and deterioration of the metal substrate 1 being further suppressed as the heating temperature of the electrode layer 2 is reduced.

It should be noted that lapping shape forming, leveling treatment, surface cutting treatment, surface polishing treatment, or the like can also be performed as the electrode layer smoothing step.

In this manner, the electrochemical element E can be manufactured. That is, the manufacturing method for an electrochemical element according to this embodiment is a manufacturing method for an electrochemical element including a metal substrate 1 (metal support), an electrode layer 2 formed on/over the metal substrate 1, and an electrolyte layer 4 formed on/over the electrode layer 2, and the method includes an electrode layer forming step of forming the electrode layer 2 with a surface roughness (Ra) of 1.0 μm or less on the metal substrate 1, and an electrolyte layer forming step of forming the electrolyte layer 4 by spraying aerosolized metal oxide powder onto the electrode layer 2.

Examples

A metal substrate 1 was produced by providing a plurality of through holes 1a through laser processing in a region with a radius of 2.5 mm from the center of a crofer 22 APU metal plate having a circular shape with a thickness of 0.3 mm and a diameter of 25 mm. It should be noted that, at this time, the through holes 1a on the surface of the metal substrate 1 were provided through laser processing.

Next, a paste was produced by mixing 60 wt % of NiO powder and 40 wt % of YSZ powder and adding an organic binder and an organic solvent (dispersion medium) thereto. The paste was used to form an electrode layer 2 on/over a region with a radius of 3 mm from the center of the metal substrate 1. It should be noted that the electrode layer 2 was formed using screen printing.

Next, CIP shape forming was performed with a pressure of 300 MPa on the metal substrate 1 on/over which the electrode layer 2 was formed, and then heating treatment was performed at 1050° C. (electrode layer forming step, diffusion suppressing layer forming step).

The electrode layer 2 obtained through the above-described step had a thickness of about m. Moreover, the He leakage amount of metal substrate 1 on/over which the electrode layer 2 was formed in this manner was 4.3 mL/minute·cm$^2$ under a pressure of 0.1 MPa.

Subsequently, powder of 8YSZ (yttria-stabilized zirconia) with a mode diameter of about 0.7 μm was aerosolized using dry air at a flow rate of 4 L/min. The aerosol was introduced into a chamber in which the pressure was set to 60 Pa, and then an electrolyte layer 4 was formed by spraying the aerosol onto 15 mm×15 mm region on/over the metal substrate 1 on/over which the electrode layer 2 was formed, so as to cover the electrode layer 2 (aerosol deposition technique). It should be noted that, at this time, the metal substrate 1 was not heated (electrolyte layer forming step).

The electrolyte layer 4 obtained through the above-described step had a thickness of approximately 5 to 6 μm. The He leakage amount of the metal substrate 1 on/over which the electrode layer 2 and the electrolyte layer 4 were formed in this manner was measured under a pressure of 0.2 MPa. The determined He leakage amount was smaller than the lower detection limit (1.0 mL/minute·cm$^2$). It was thus confirmed that a high-quality electrolyte layer 4 that was dense and had increased gas barrier properties was formed.

Next, a paste was produced by adding an organic binder and an organic solvent (dispersion medium) to fine powder of GDC. The paste was used to form a reaction preventing layer 5 on/over the electrolyte layer 4 of the electrochemical element E using screen printing.

Thereafter, the reaction preventing layer 5 was formed by performing heating treatment at 1000° C. on the electrochemical element E on/over which the reaction preventing layer 5 was formed (reaction preventing layer forming step).

Furthermore, a paste was produced by mixing GDC powder and LSCF powder and adding an organic binder and an organic solvent thereto. The paste was used to form a counter electrode layer 6 on/over the reaction preventing layer 5 using screen printing. Lastly, a final electrochemical element E was obtained by heating, at 900° C., the electrochemical element E on/over which the counter electrode layer 6 was formed (counter electrode layer forming step).

Hydrogen gas and air were respectively supplied to the electrode layer 2 and the counter electrode layer 6, and the open circuit voltage (OCV) of the obtained electrochemical element E serving as a cell for a solid oxide fuel cell was measured. The result was 1.05 V at 750° C.

Another sample was produced in the same manner, and the surface roughness (Ra) of the electrode layer 2 of this sample was measured using a laser microscope. Table 3 shows the results.

TABLE 3

| | Surface roughness (Ra) of electrode layer | |
| --- | --- | --- |
| | Calculated value for 259-μm width | Calculated value for 642-μm width |
| Sample 8 | 0.12 μm to 0.165 μm | 0.237 μm to 0.276 μm |

In Sample 8, the surface roughness (Ra) of the electrode layer 2 was 1.0 μm or less, and a favorable electrolyte layer 4, a favorable reaction preventing layer 5, and a favorable counter electrode layer 6 could be formed on/over the electrode layer 2.

It was shown from the above results that setting the surface roughness (Ra) of the electrode layer 2 to 1.0 μm or less makes it possible to form a favorable electrolyte layer.

OTHER EMBODIMENTS (1) Although the electrochemical elements E are used in a solid oxide fuel cell in the above-described embodiments, the electrochemical elements E can also be used in a solid oxide electrolytic cell, an oxygen sensor using a solid oxide, and the like.

(2) Although the present application is applied to a metal-supported solid oxide fuel cell in which the metal substrate 1 serves as a support in the above-described embodiments, the present application can also be applied to an electrode-supported solid oxide fuel cell in which the electrode layer 2 or counter electrode layer 6 serves as a support, or an electrolyte-supported solid oxide fuel cell in which the electrolyte layer 4 serves as a support. In such cases, the functions of a support can be obtained by forming the electrode layer 2, counter electrode layer 6, or electrolyte layer 4 to have a required thickness.

(3) In the above-described embodiments, a composite material such as NiO-GDC, Ni-GDC, NiO—YSZ, Ni—YSZ, $CuO—CeO_2$, or $Cu—CeO_2$ is used as the material for forming the electrode layer 2, and a complex oxide such as LSCF or LSM is used as the material for forming the counter electrode layer 6. With this configuration, the electrode layer 2 serves as a fuel electrode (anode) when hydrogen gas is supplied thereto, and the counter electrode layer 6 serves as an air electrode (cathode) when air is supplied thereto, thus making it possible to use the electrochemical element E as a cell for a solid oxide fuel cell. It is also possible to change this configuration and thus configure an electrochemical element E such that the electrode layer 2 can be used as an air electrode and the counter electrode layer 6 can be used as a fuel electrode. That is, a complex oxide such as LSCF or LSM is used as the material for forming the electrode layer 2, and a composite material such as NiO-GDC, Ni-GDC, NiO—YSZ, Ni—YSZ, $CuO—CeO_2$, or $Cu—CeO_2$ is used as the material for forming the counter electrode layer 6. With this configuration, the electrode layer 2 serves as an air electrode when air is supplied thereto, and the counter electrode layer 6 serves as a fuel electrode when hydrogen gas is supplied thereto, thus making it possible to use the electrochemical element E as a cell for a solid oxide fuel cell.

It should be noted that the configurations disclosed in the above-described embodiments can be used in combination with configurations disclosed in other embodiments as long as they are compatible with each other. The embodiments disclosed in this specification are illustrative, and embodiments of the present invention are not limited thereto and can be modified as appropriate without departing from the object of the present invention.

INDUSTRIAL APPLICABILITY

The present invention can be applied to an electrochemical element and a cell for a solid oxide fuel cell.

LIST OF REFERENCE NUMERALS

1: Metal substrate (metal support)
1*a*: Through hole
2: Electrode layer
3: Intermediate layer
4: Electrolyte layer
5: Reaction preventing layer
6: Counter electrode layer
E: Electrochemical element

The invention claimed is:

1. A manufacturing method for an electrochemical element including a metal support, an electrode layer formed on/over the metal support, and an intermediate layer formed on/over the electrode layer, the method comprising:

an intermediate layer forming step of forming the intermediate layer having a region with a surface roughness (Ra) of 0.224 μm or less on the electrode layer; and an electrolyte layer forming step of forming an electrolyte layer having a density of 90% or more by spraying aerosolized metal oxide powder onto the intermediate layer, wherein the intermediate layer forming step includes smoothing a region of the intermediate layer and heating the intermediate layer at a temperature of 1050° C. or lower, wherein the electrode layer is at least partially disposed between the metal support and the electrolyte layer, wherein the metal support has at least one through hole inside a region in which the electrolyte layer is formed, and wherein the metal support has a thickness of 0.1 mm to 0.5 mm, the electrode layer has a thickness of 5 μm to 50 μm, the intermediate layer has a thickness of 2 μm to 50 μm, the metal support is ferrite-based stainless steel, the intermediate layer is GDC or YDC, and a metal oxide thin layer is provided on/over a surface of the metal substrate, and said metal oxide thin layer is provided also on a surface that is in contact with the electrode layer and an inner surface of the through hole.

\* \* \* \* \*